Figure 1:
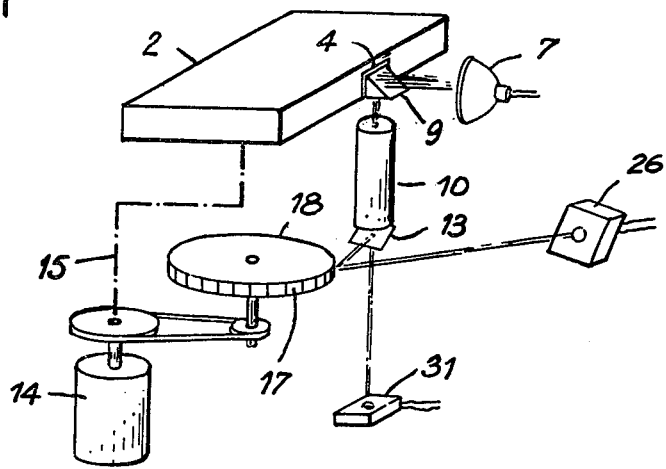

United States Patent [19]

Golay et al.

[11] 4,133,005

[45] Jan. 2, 1979

[54] APPARATUS FOR THE TREATMENT OF INFORMATION IN AN OPTICAL FORM

[76] Inventors: Bernard Golay, 62 rue Vasco de Gama, 75015 Paris; Daniel Mouléne, 12 Impasse du Ruisseau, 74000-Annecy-le-Vieux, both of France

[21] Appl. No.: 690,328

[22] Filed: May 26, 1976

[30] Foreign Application Priority Data

May 28, 1975 [FR] France .............................. 75 16697

[51] Int. Cl.² .......................... H04N 5/86; H04N 5/88
[52] U.S. Cl. ..................................... 358/132; 358/199; 358/202; 358/203; 358/204; 358/206; 358/214; 358/215
[58] Field of Search ............... 178/DIG. 28; 358/102, 358/127, 132, 199, 202, 203, 204, 206, 214, 215

[56] References Cited

U.S. PATENT DOCUMENTS

| | | | |
|---|---|---|---|
| 2,376,645 | 5/1945 | Wolff | 358/214 |
| 2,622,147 | 12/1952 | Condliffe | 358/214 |
| 2,818,467 | 12/1957 | Harris | 358/215 |
| 3,607,457 | 9/1971 | Hagg | 148/12.1 |
| 3,624,291 | 11/1971 | Miyata | 178/DIG. 28 |
| 3,659,049 | 4/1972 | Stevens | 178/DIG. 28 |
| 3,663,750 | 5/1972 | Besier | 178/DIG. 28 |
| 3,679,827 | 7/1972 | Boltz | 178/DIG. 28 |
| 3,707,600 | 12/1972 | Schauffele | 178/DIG. 28 |
| 3,803,353 | 4/1974 | Sanderson | 178/DIG. 28 |
| 3,804,978 | 4/1974 | Lemelson | 178/DIG. 28 |
| 3,876,842 | 4/1975 | Bouhuis | 178/DIG. 29 |
| 3,970,775 | 7/1976 | Lemelson | 178/DIG. 28 |

Primary Examiner—Howard W. Britton
Attorney, Agent, or Firm—Arnold, White & Durkee

[57] ABSTRACT

Apparatus for reproducing information recorded on a flexible, opaque tape in the form of successive images having a high resolution such that they cannot be read by the naked eye.

The apparatus comprises a tape drive for advancing the tape to and through a presentation zone. A luminous source provides a luminous scanning flux directed towards the presentation zone. A photo-sensitive device receives a beam of luminous flux reflected from the image on the tape at the presentation zone and transforms the variations in luminous intensity into electrical signals.

If the successive images are television fields, then the electrical signals are used to produce a visible image on a television receiver. Alternatively if the images are documentary records, the electrical signals are fed to a viewing apparatus for reading by a user or copying.

18 Claims, 9 Drawing Figures

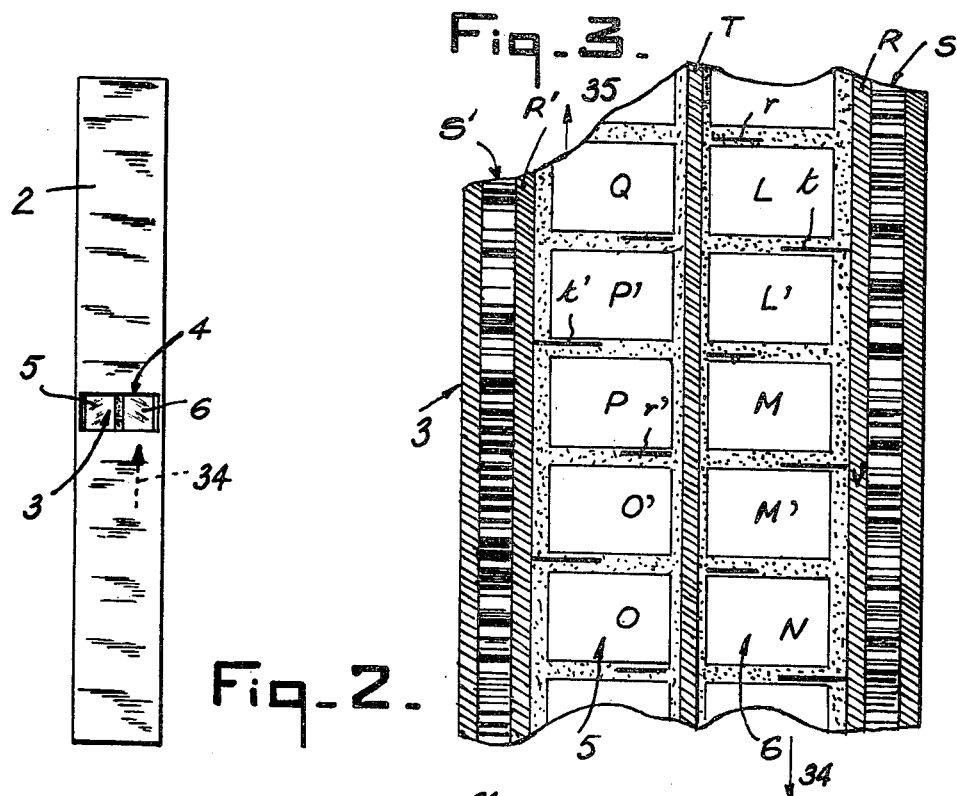
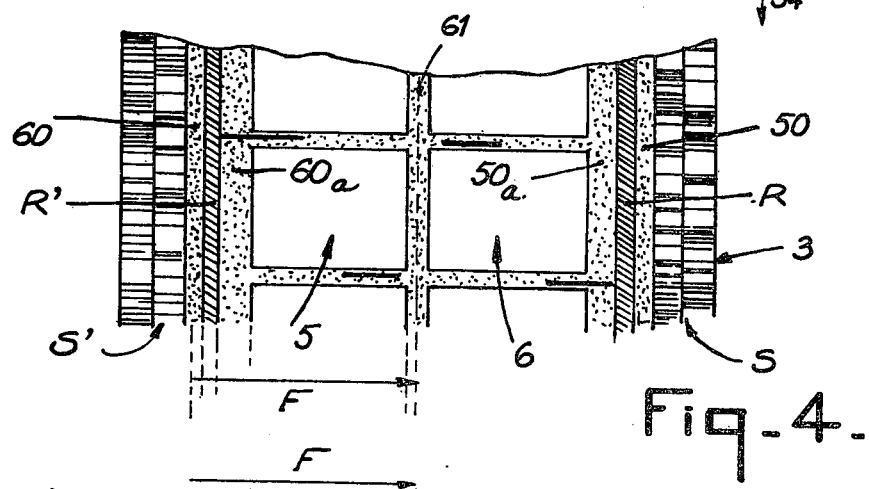
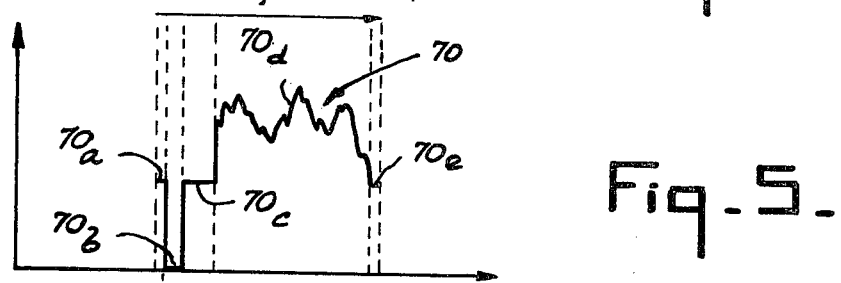

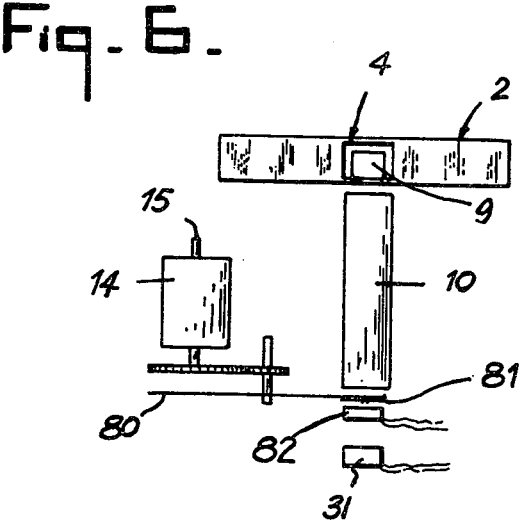
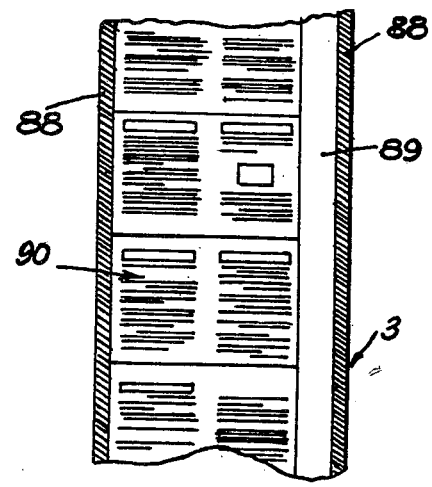
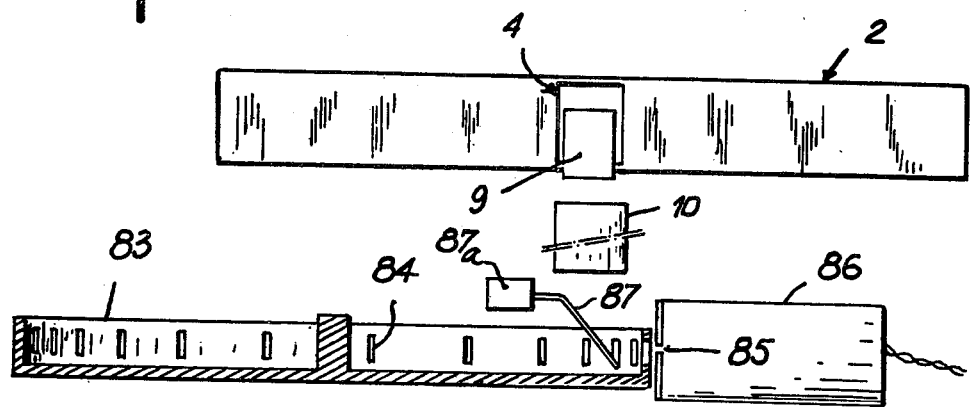

APPARATUS FOR THE TREATMENT OF INFORMATION IN AN OPTICAL FORM

The invention relates to the treatment of information, for example of pictorial and/or sound information, which information is in the form of optical elements or optical structures recorded on or reproduced from a support intended to be read optically.

In the above general technical field, various technical solutions intended to allow the reading and reproduction of information stored in an optical form on a support have already been proposed.

Thus it has been proposed to use, as an information carrier in an optical form, a plane rigid and opaque support whereof the optical information is read by a scanning light beam emitted by a source of light and so directed as to produce, after reflection by the scanned information, a reflected beam which is directed by an optical system to a photosensitive device. The rigid and opaque plane support can consist of a disc, as is taught by U.S. Pat. No. 3,404,224, or of a plate, as is disclosed by the review "FUNKSCHAU" volume 46, No. 26 of 20th Dec. 1974, pages 1,028–1,030.

Though the above technical solutions make it possible to obtain acceptable results from the point of view of releasing the information, it must be noted that the storage principle which they employ is in reality the cause of substantial disadvantages.

First of all, it is certain that such plane supports offer a defined useful surface area which consequently restricts the amount of information which can be stored if the said support is, in practice, not to be of unacceptable size. In an attempt to resolve this problem, efforts have been made to ensure that optical structures of very small size are recorded so as thus to be able substantially to increase the storage capacity for an acceptable given useful surface area of an opaque rigid support. In this way, the art has arrived at recording details of the order of a micron. Apart from the difficulty of recording and duplicating such supports, it should be noted that the precise reading of such small information presents numerous problems even when employing — as is, incidentally, indispensable — a complex and very expensive apparatus for detection, reading, support and processing in general. In fact, the reading of optical structures of such small size is influenced by grains of dust, hair, scratches and the like and consequently the release of the information stored is interfered with. This major disadvantage resulting from a delicate and expensive recording technique furthermore does not even have the advantage of completely eliminating the preceding disadvantage because, in any case, the recording capacity, even increased by such a process, will be limited whilst the support nevertheless will have a not insignificant bulk due to its large surface area.

Attempts have also been made to improve this technique by proposing, as in French Pat. No. 2,136,707, the use of a transparent disc, but very obviously such a disc suffers from the disadvantage of large bulk, even if it permits a gain in capacity.

In order to try and overcome the above disadvantages, it has also been proposed to use, as the optical information carrier, a flexible tape or strip which can be wound up and which is one of the most universally known supports for storage of information in the general sense. One had available, for this purpose, information derived from the use of perforated tapes read by pneumatic, mechanical or even optical detection even though the information carried did not in itself have the character of optical structures, and from the use of magnetic tapes and cinematographic films.

Attention was naturally focussed on supports of the cinematographic type, that is to say transparent tapes, because there are well-proven techniques available. In this technique, in particular illustrated by French Pat. No. 2,149,654 and U.S. Pat. Nos. 3,679,817 and 3,702,896, the reading of the information carried by the transparent support is effected by a light beam which passes through the said support so that the beam modulated by the optical information is directed, through a suitable optical system, to a photo electric transducer, the task of which is to convert the variations of light intensity, which it receives, into variations in electrical potential used to control or feed any reproduction apparatus or control apparatus.

The use of a transparent tape or strip is not free from constraints and even presents certain requirements which have the effect of significantly increasing the cost of exploitation of such a technique. In fact, the transparent support must be free from faults over its thickness, so that the limited choice of usable material does not make it possible to obtain an inexpensive support. Furthermore, as a result of this constraint in respect of the optical properties, there is no possibility of texturising the support, which presents a problem in respect of its mechanical strength. In consequence, it is thus essential to use a fine, flexible and transparent support, which is free from surface faults and/or faults in the body of the material, and is homogeneous and of acceptable mechanical strength, bearing in mind the conventional means employed to drive it. These requirements, which can be combined from a technical point of view, considerably increase the cost price of a support meeting the requirements, to the point that such a support has not achieved, or cannot achieve, very widespread use.

In reality, there is always a tendency towards a flexible transparent support in spite of the constraints to which it is subject, because it is known that such a support is the only one which allows the high yield required to be achieved, in particular by projection of the reduced-size image from a support onto a large screen. Furthermore, if it is desired to achieve a reasonable size, it is necessary to have high resolution and currently it is only the transparent supports supplied by the photographic emulsion industry which make it possible to meet this requirement.

Thus, the idea has never yet been presented of using, as the flexible support, a material other than a transparent tape or strip for the storage and release of information of an optical structure.

The object of the invention is specifically to employ, for the storage and release of information of an optical structure, a tape or a strip which is flexible but opaque and is read by reflection, which permits a high storage capacity to be achieved without exhibiting the disadvantages of the transparent tape.

As an opaque support, one tends to think of photographic paper or of printed paper. However, the photographic paper immediately appears too thick, whilst the printed paper seems thin and fragile. This results from the fact that the ratio of the thickness to the strength is frequently incorrectly evaluated by persons who are not familiar with the paper industry. Thus it has been necessary to conceive as an opaque support a material which has never yet received even similar use. Furthermore it was also necessary to overcome the prejudice which most frequently results, in the conception of an optical assembly, from the idea of a source image which is diffusing or reflecting because of its low yield compared to that of a transparent image. However, though this is of great importance in cinematographic technique, the same is not true in other applications such as video-signal reproduction, visual presentation of archives, or control or programming of the operation of machines, apparatuses or various devices, given the fact that currently sensitive transducers which are, furthermore, inexpensive, are available.

The choice, according to the invention, of employing an opaque flexible tape for the storage and release of information for optical reading, furthermore presents the additional advantage of making a larger selection of materials acceptable, as compared to the constraints which apply to the flexible transparent tape, and furthermore, of permitting the use of less elaborate and hence less expensive materials, becuse their principal characteristic has to be that they have a surface which is free from faults, which is easily achievable by a surface treatment.

Furthermore, the fact of using an opaque flexible tape makes it possible to dispense with the small character size imparted to the optical information on opaque rigid supports in order to increase the storage capacity, and consequently eliminates the supplementary requirement of employing a particularly precise and complex reading and release apparatus. The invention thus makes it possible, by combining an opaque flexible tape and a simple processing apparatus, to achieve a unit of particularly low cost compared to similar equipment proposed hitherto and hence of opening up the prospect of possible widespread use in application to video-cassette programmes, thus including, in this case, visual and sound recordings, application to various machinery controls, application to visual presentation of archives, and the like.

According to the present invention there is provided apparatus for reproducing information of an optical character recorded on a flexible opaque tape, the apparatus comprising support means for a flexible, opaque tape, at least one feed means for advancing the tape along a path of movement to and through a presentation zone, and a tape reading assembly comprising a luminous source for providing a luminous scanning flux directed towards the presentation zone, and at least one photo-sensitive device for receiving the beam of luminous flux reflected by the tape and for transforming the variations in luminous intensity into electrical signals.

Figure 1A:
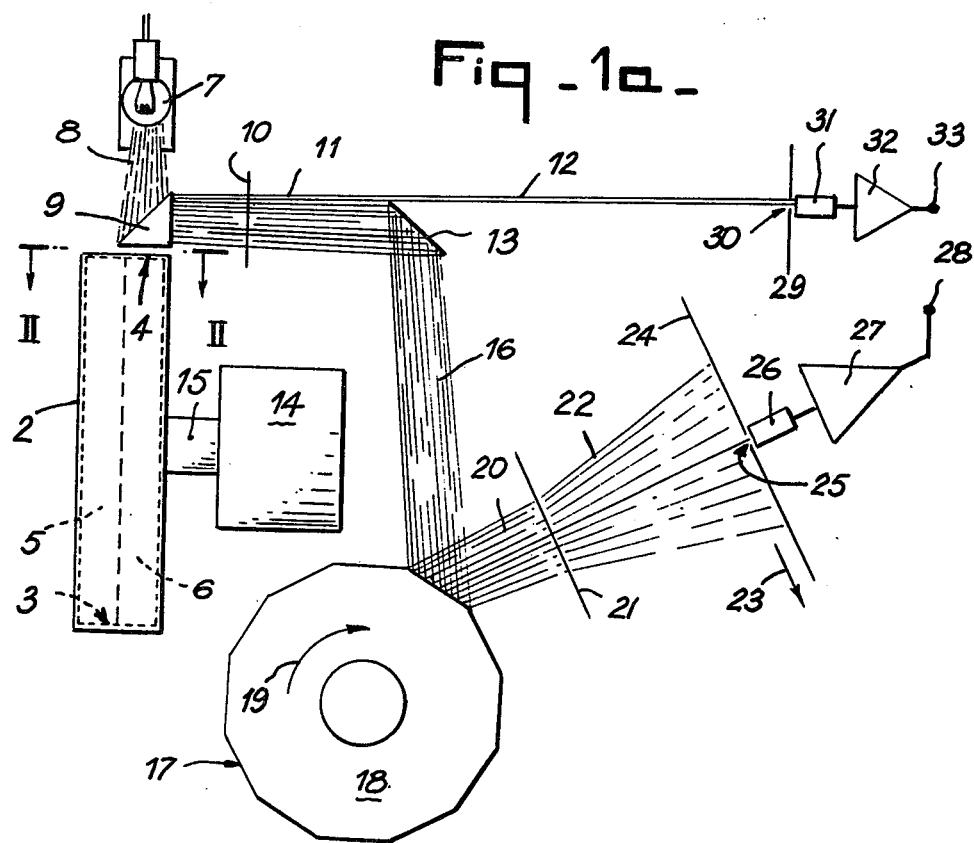

The present invention will now be described, by way of example, with reference to the accompanying drawings, wherein:

FIG. 1 is an exploded perspective view of a first embodiment of an apparatus, in accordance with the present invention, FIG. 1a represents a schematic representation of the principle of operation of the apparatus according to FIG. 1, FIG. 2 is a plan view substantially along line II—II of FIG. 1a, FIG. 3 is an enlarged view of a portion of the opaque support, in the form of a tape, FIG. 4 is a view similar to FIG. 3 but showing a different embodiment of the opaque support, FIG. 5 is a schematic representation showing the signal output produced using the support shown in FIg. 4, FIG. 6 is a side elevation view showing another embodiment of an apparatus in accordance with the present invention, FIG. 7 is a schematic side view, partly in cross-section, which shows, on a different scale, a further embodiment of the apparatus in accordance with the present invention, and FIG. 8 is an enlarged view of a portion of an opaque support having static information, for example documentary records, recorded thereon.

Reference will now be made to FIGS. 1 to 3 which relate to an apparatus as applied to the reproduction of video programmes onto a television receiver.

The apparatus 1 utilises a cassette 2 inside which is wound up a tape 3 consisting of a strip of thin photographic paper on which appear two contiguous tracks 5 and 6 of optical images L, L', M, M', N, N' or O, O', P, P', Q, Q' (FIG. 3) of a cinematographic programme or television programme. These two tracks, read one after the other by turning the cassette 2 over, increase the capacity of the cassette. Their images appear successively behind the window 4 of the cassette 2 as this tape 3 travels longitudinally in the cassette. On each of the two tracks 5 or 6, the line after line analysis of an image L, in the direction of the arrow 34 (FIG. 3) or of an image P, in the direction of the arrow 35, provides the video signal of a first sweep or field of the frame of the picture to be displayed on the screen of the television receiver associated with the system, whilst the analysis of the next image L' or P' provides the video signal of a second supplementary sweep or field of this frame, interspaced between the lines of the first. For this purpose, staggered signs "t" and "r", and "t'" and "r'" respectively are provided, which, when read, bring about the synchronisation of the vertical sweep of the screen of this television receiver, once according to a first sweep or field and next according to an interlaced second sweep or field. Each of the image tracks 5 and 6 is provided with a lateral sound track S' or S respectively, imprinted in "variable density" in accordance with the well-known process of sound cinematography. A middle track T and two side tracks R and R', which are black, synchronise, for each track, the line sweep of the screen of the television receiver associated with the system.

The longitudinal travel of the tape 3 in the cassette 2 is brought about by a drive device 14 and its transmission 15. The window 4 of the cassette 2 is illuminated by a small light source 7, the flux 8 of which passes through a 45° prism 9 fitted onto the useful half of this window 4 by one of its small sides. The flux 8 passes through the hypotenuse face of this prism 9, and this hypotenuse face furthermore redirects, by total reflection, the light flux reflected by the image track, in this case the track 6, which appears through the window 4 under the prism 9. This latter (reflected) flux emerges from the prism 9 through the other small side of this prism, and then passes through an objective 10, which imparts to it a direction 11, at the beginning of which it is divided into two. A first part, 12, of the flux 11, that is to say the part which carries the image reflected by the sound track S, is fed directly onto a reading slot 30 produced in a screen 29 behind which a photocell 31 transforms the light density variations of the track S into a modulated electrical signal, amplified by an amplifier 32 and transmitted at 33 to the "sound" part of the television receiver associated with the apparatus. The other part of the flux 11 is directed along direction 16, by a fixed mirror 13, towards a moving optical device, such as a drum 18 rotating in the direction of the arrow 19, the periphery of which drum is formed of mirrors 17, the orientation of which mirrors is varied by the rotation of the drum 18. Hence each of these mirrors 17 in turn reflects the flux 16, which travels along a fixed direction, so as to become a flux 20, of varying direction, which passes through a divergent optical system 21. Beyond this system, the flux 22 forms, on a screen 24, an image I which is enlarged and is movable laterally along the arrow 23, of the part of the track 6 which at that time appears travelling longitudinally behind the window 4. This screen 24 has an orifice 25 before which there thus travels only one, substantially transverse, line of this enlarged image of the visible part of the track 6. Behind this orifice 25 is placed a photocell 26 which converts the light intensity variations which appear along this mobile "line image" into a video signal which is amplified by a video amplifier 27 which, at the output 28, delivers a signal which is applied to the video input of the television receiver associated with the apparatus, if such is provided, or, if not, which is modulated to UHF or VHF signals which encounter the aerial of this receiver.

By way of example, in the case of application to a standard European television receiver, that is to say with 625 lines and 25 frames per second, it is possible to use a drum comprising 120 facets or mirrors 17 and revolving at 7,812.5 revolutions per minute. In the case of the so-called American standard, that is to say 525 lines and 30 frames per second, it is possible to use a drum with 120 mirrors revolving at 7,875 revolutions per minute.

The opaque strip 3 may comprise a paper. It can also be produced from cellulose acetate or from one of its derivatives, from polyester, from polyvinyl chloride or from any other material. In order to improve the mechanical properties of the opaque strip, the latter can be texturised, in the same way as is done for certain magnetic tapes. The texturising can be carried out on one face, or on the inside, of the opaque strip.

The surface of the strip which receives the information can be of a variety of types. It can, first of all, be subjected to a surface treatment, for example a bleaching treatment. The surface in question can carry a photographic emulsion, for example a silver salt emulsion. It can be sensitive to visible light rays or to ultraviolet radiation, to X-rays, to infra-red rays and even to particle radiation.

This layer can furthermore be of such a nature that it is suitable for so-called reprography processes, which may be electro-copying, diazo-copying, thermocopying, xerography and the like. It can be provided simply for a printing or offset process.

An essential characteristic of the opaque strip which acts as the information support is that it carries the information on at least one of its faces in the form of optical elements which have a high resolution such that these elements are not discernible with the naked eye and can only be "read", by specular or diffuse reflection from the strip, by a photosensitive device.

FIG. 4 shows an embodiment according to which the tape 3, in the form of a strip, comprises line synchronisation tracks R and R', which are separated from the sound tracks S and S' by zones 50-60 of the same optical density as the zones 50a-60a that surround the optical images. Referring to FIG. 5, it will be seen that this embodiment makes it possible to obtain, from a line sweep along arrow F, an electrical signal 70 composed of the end of the front porch 70a of the line synchronisation pulse, corresponding to the zone 60, the pulse proper 70b, corresponding to the zone R', the back porch 70c of the pulse 70b, corresponding to the zone 60a, the video signal 70d, corresponding to the electrical conversion of the optical information, and the start of the front porch 70e of the next line synchronisation pulse, corresponding to the longitudinal median zone 61 of the tape 3 (FIG. 4). This makes it possible to release a supplementary signal intended to achieve the receiver sweep synchronisation.

In the embodiment according to FIGS. 1 and 1a, the field sweep is provided by the movement of the strip 3, whilst the line sweep is effected via the movable optical device represented by the drum 18. In place of the drum, it is also possible to use a disc which employs, and furthermore improves, the concept of the NIPKOV disc. In fact, in the NIPKOV disc, each hole of the disc corresponds to the analysis of one line of the image, but in order to carry out the vertical analysis there must be as many holes on the disc as there are lines on the image, namely, for example, 625 holes in the case of the European standard, which appears prohibitive. Furthermore, excellent precision is required in the positioning and creation of the holes. Finally, the analysis is carried out along an arc of a circle in place of a horizontal line.

FIG. 6 shows disc 80 comprising apertures of a general direction transverse to a reading slot produced in a screen 81 interposed between the disc and a photosensitive device 82, so as to permit the analysis of one line. By way of example, in the case of application to the release of images onto a standard European television receiver, 80 apertures may be provided in the disc 80 and this disc may be rotated at 11,718.75 revolutions per minute. In the case of the so-called American standard, the above values are respectively equal to 80 and 11,812.5.

FIG. 7 represents another variant in which the moving optical device consists of a drum 83, in the peripheral wall of which are provided apertures 84 of axial general direction, at right angles to the direction of a reading slot 85 of a photosensitive device 86. The drum 83 is associated with a mirror 87, on which falls the modulated light beam coming from the prism 9. The mirror 87 can be associated with an actuator 87a, constituting a vertical sweeping device which replaces the movement of the tape 3 if the latter is immobilised in order to permit stopping on an image.

In the above applications, an extension to the reproduction of colour programmes is obviously possible, for example using a tape which reproduces all the colours and is separately analysed by three filters each corresponding to a primary colour, each of which filters is associated with a particular analysis system, and three video signals thus being emitted for the red, the green and the blue. This process makes it possible to achieve black and white/colour system compatibility.

It is also possible to conceive of using three black and white tracks, each coded by one of the fundamental colours or its complementary colour, by interposing suitable filters during viewing or during the duplicating operation.

In order to reduce the surface area it is possible to use two single-colour tracks, one corresponding to the luminosity information and the other to the colour information.

Other devices for the transverse analysis of the image, reflected through the window, of the image track which travels longitudinally behind this window, can be used, though less economically. Such a device may be a strip of photocells located behind the objective 10, each of the photocells being activated so as to analyse successively one line. It is also possible to envisage systems of analysis employing gradual variation of a plane of polarisation (FARADAY effect) or of a refractive index (KERR effect), or employing variation of indices by the effect of ultrasonics. It is also possible to envisage transverse analysis of the deviation of light rays emitted electromechanically other than by the preferred method, for example by means of mirrors mounted on a chopper, on piezo-electric quartz or on a magnetrostriction device. It is also possible, though expensive, to use for this analysis a photomultiplier of the "image dissection tube" type, equipped, between the photocathode and the first dynode, with a device for the transverse deviation of the analysed electronic image onto the said dynode through a minuscule window corresponding to a point-image.

For example, it is possible to provide a "flying spot" which is extensively used in telecinematic techniques, that is to say when a cinematographic film is read in order to convert it into television signals. A flying spot provided by a cathode tube is projected onto the image and scans this image. The light diffused by the point on which the spot impinges is collected by a fixed transducer. The optical output of the opaque support is low but this can be compensated by a high sensitivity of the transducer, which may consist, for example, of a photomultiplier.

In a variant, the flying spot could be replaced by a very fine laser beam sequentially deflected by a deflector system.

It is also possible, for example, to envisage replacing the prism 9 and the objective 10 by a set of optical fibres.

It should be noted that the apparatus in accordance with the invention can find other applications. In particular, the information read in the manner described can be intended to serve as control information, for example for programming of various machines, and as a replacement for perforated tapes or magnetic tapes currently used in the data treatment field. In such an application, substantial gains in the rate of recording, in the information density and in the rate of reading, are then obtained.

Yet another example, regarding the nature of the information, can be provided by archival work. It is possible, in this field, to replace microfilms, and to do so at a lower cost price. However, even in a case where the definition is not as perfect, one must not forget the possibility of compensating for this handicap by using both faces of the strip. Finally, it should be noted that there is no longer a problem of optical amplification of the image because once the latter is received by some type of photoelectric reading device, it can be amplified electronically and fed, for example, onto the screen of a television receiver. In the case in question, the strip 3 can have the appearance shown schematically in FIG. 8, which shows the black edges 88, a register track 89 and the archive documents, in the form of micro-cards 90. In such a case it is for example possible to use, advantageously, a vidicon tube or integrated circuits functioning in a television camera. In this type of application, the strip 3 is not subjected to a continuous movement but instead to a stop-go or intermittent movement.

We claim:

1. Apparatus for reproducing information of an optical character recorded on a flexible, opaque tape of a type having at least one track of images composed of informations having a high resolution such that they are indiscernible to the naked eye, said apparatus comprising, in combination:
   (A) support means for said flexible tape;
   (B) means defining a presentation zone;
   (C) at least one feed means for advancing said tape along a path of movement to and through said presentation zone; and
   (D) a tape reading assembly for reading the tape during movement of the tape and including
      (a) a fixed luminous source for providing a luminous scanning flux directed to said presentation zone, and
      (b) means for analyzing said tape line by line comprising at least one photosensitive device positioned to receive a beam of luminous flux reflected by the tape at said presentation zone, for transforming the variations in luminous intensity into electrical signals.

2. Apparatus as claimed in claim 1, wherein said feed means is a continuous feed means for advancing the flexible, opaque tape, continuously through said presentation zone, wherein said tape reading assembly comprises means such that the image reflected from the portion of the tape at the presentation zone remains stationary for a time interval permitting its analysis by said photo-sensitive device.

3. Apparatus as claimed in claim 1, wherein said feed means comprises continuous feed means for the flexible opaque tape.

4. Apparatus as claimed in claim 1, wherein said tape reading assembly includes means for sequentially deviating said reflected flux beam, said means comprising a rotatable drum having mirrors on a peripheral surface thereof, each mirror, during the rotation of the drum receives said reflected flux beam and directs the flux along a rotating path for permitting line analysis in the direction of the said photo-sensitive device.

5. Apparatus as claimed in claim 1, wherein said tape reading assembly includes means for analyzing said tape line by line, said means comprising a rotatable disc provided with equidistant apertures which successively cut the said respective flux to permit the line-by-line analysis of the reflected beam by said photo-sensitive device.

6. Apparatus as claimed in claim 1, wherein said tape reading assembly includes means for analyzing said tape line by line, said means comprising a rotatable drum provided at its periphery with equidistant apertures tracking successively the reflected flux beam to permit line-by-line analysis by said photo-sensitive device.

7. Apparatus as claimed in claim 1, wherein said photosensitive device is constituted by a bank of simultaneously active photocells and further comprising means to interrogate said photocells one after the other to analyze a flux beam line reflected from said tape.

8. Apparatus according to claim 1, wherein said photo-sensitive device is a television image analyser.

9. Apparatus according to claim 1, wherein said reading assembly comprises means for producing a beam forming a luminous spot on the tape and further comprising means for scanning the tape line-by-line by the spot.

10. Apparatus for reproducing information of an optical character recorded on a flexible, opaque tape of a type having at least one track of images composed of informations having a high resolution such that they are indiscernible to the naked eye, said apparatus comprising, in combination:
(A) support means for said flexible tape;
(B) means defining a presentation zone and means for accomplishing a horizontal and vertical scanning;
(C) at least one feed means for advancing said tape along a path of movement to and through said presentation zone; and
(D) a tape reading assembly for reading the tape when it is stopped and including
(a) a fixed luminous source for providing a luminous scanning flux directed to said presentation zone; and
(b) means for accomplishing a vertical scanning comprising at least one photosensitive device positioned to receive a beam of luminous flux reflected by the tape at said presentation zone, for transforming the variations in luminous intensity into electrical signals.

11. Apparatus as claimed in claim 10, wherein said tape reading assembly includes means for sequentially deviating said reflected flux beam, said means comprising a rotatable drum having mirrors on a peripheral surface thereof, each mirror, during the rotation of the drum receives said reflected flux beam and directs the flux along a rotating path for permitting line analysis in the direction of said photo-sensitive device.

12. Apparatus as claimed in claim 10, wherein said tape reading assembly includes means for analyzing said tape line by line, said means comprising a rotatable disc provided with equidistant apertures which successively cut said respective flux to permit the line-by-line analysis of the reflected beam by said photo-sensitive device.

13. Apparatus as claimed in claim 10, wherein said tape reading assembly includes means for analyzing said tape line by line, said means comprising a rotatable drum provided at its periphery with equidistant apertures tracking successively the reflected flux beam to permit line-by-line analysis by said photo-sensitive device.

14. Apparatus as claimed in claim 10, wherein said photosensitive device comprises a bank of simultaneously active photocells and further comprises means to interrogate said photocells one after the other to analyze a flux beam line reflected from said tape.

15. Apparatus according to claim 10, wherein said reading assembly comprises means for producing a beam forming a luminous spot on the tape and further comprising means for scanning the tape line-by-line and vertically by the spot.

16. Apparatus as claimed in claim 10, wherein said feed means is a continuous feed means for advancing the flexible, opaque tape continuously through said presentation zone, wherein said tape reading assembly comprises means such that the image reflected from the portion of the tape at the presentation zone remains stationary for a time interval permitting its analysis by said photosensitive device.

17. Apparatus as claimed in claim 10, wherein said means for accomplishing a vertical scanning comprises a sweeping mirror.

18. Apparatus as claimed in claim 10, wherein said photosensitive device is a television image analyzer.

* * * * *